(12) United States Patent
Dong et al.

(10) Patent No.: US 12,100,203 B2
(45) Date of Patent: Sep. 24, 2024

(54) ABOVE-HORIZON TARGET TRACKING

(71) Applicant: Aurora Flight Sciences Corporation, Manassas, VA (US)

(72) Inventors: Yi Dong, Cambridge, MA (US); Michael Sardonini, Cambridge, MA (US)

(73) Assignee: The Boeing Company, Arlington, VA (US)

( * ) Notice: Subject to any disclaimer, the term of this patent is extended or adjusted under 35 U.S.C. 154(b) by 161 days.

(21) Appl. No.: 17/464,521

(22) Filed: Sep. 1, 2021

(65) Prior Publication Data
US 2022/0121850 A1 Apr. 21, 2022

Related U.S. Application Data

(60) Provisional application No. 63/093,776, filed on Oct. 19, 2020.

(51) Int. Cl.
*G06V 20/10* (2022.01)
*G05D 1/00* (2006.01)
(Continued)

(52) U.S. Cl.
CPC .......... *G06V 20/10* (2022.01); *G05D 1/0094* (2013.01); *G05D 1/1064* (2019.05); *G06T 5/77* (2024.01);
(Continued)

(58) Field of Classification Search
CPC ........ G06V 20/10; G06V 20/17; G06V 10/34; G06V 10/40; G06V 10/56; G06V 10/62;
(Continued)

(56) References Cited

U.S. PATENT DOCUMENTS

2014/0297068 A1 10/2014 Revell et al.
2016/0114905 A1 4/2016 Derenick et al.
(Continued)

FOREIGN PATENT DOCUMENTS

CN 104899554 A * 9/2015 ............... G01C 3/00
CN 111222511 A * 6/2020
(Continued)

OTHER PUBLICATIONS

Decroon et al, Sky Segmentation Approach to Obstacle Avoidance, 2011, IEEE Aerospace, pp. 1-32. (Year: 2011).*
(Continued)

*Primary Examiner* — Aaron W Carter
*Assistant Examiner* — Kathleen M Broughton
(74) *Attorney, Agent, or Firm* — Kunzler Bean & Adamson

(57) ABSTRACT

Disclosed herein is a system that comprises an imaging sensor coupled to a robot. The system also comprises an imaging module configured to capture images of a scene within a field of view of the imaging sensor, which is coupled to the robot. The system further comprises an image-processing module configured to process the captured images to identify an object above a horizon in the scene within the field of view of the imaging sensor. The system additionally comprises a tracking module configured to track a trajectory of the object based on the captured images to determine positions of the object relative to the robot.

20 Claims, 7 Drawing Sheets

(51) Int. Cl.
| | |
|---|---|
| G06T 5/77 | (2024.01) |
| G06T 7/11 | (2017.01) |
| G06T 7/136 | (2017.01) |
| G06T 7/246 | (2017.01) |
| G06T 7/50 | (2017.01) |
| G06T 7/73 | (2017.01) |
| G06V 10/40 | (2022.01) |
| H04N 23/60 | (2023.01) |

(52) U.S. Cl.
CPC ............ *G06T 7/11* (2017.01); *G06T 7/136* (2017.01); *G06T 7/246* (2017.01); *G06T 7/50* (2017.01); *G06T 7/73* (2017.01); *G06V 10/40* (2022.01); *H04N 23/60* (2023.01); *G06T 2207/20036* (2013.01); *G06T 2207/30241* (2013.01)

(58) Field of Classification Search
CPC .... G05D 1/0094; G05D 1/1064; G06T 5/005; G06T 7/11; G06T 7/136; G06T 7/246; G06T 7/50; G06T 7/73; G06T 2207/20036; G06T 2207/30241; H04N 23/60; G08G 5/04
See application file for complete search history.

(56) References Cited

U.S. PATENT DOCUMENTS

| | | | |
|---|---|---|---|
| 2016/0137309 A1 | 5/2016 | Franklin et al. | |
| 2017/0023473 A1* | 1/2017 | Wegner | G06T 7/11 |
| 2018/0082438 A1* | 3/2018 | Simon | G06T 7/74 |
| 2019/0019423 A1* | 1/2019 | Choi | G05D 1/0088 |
| 2019/0066522 A1* | 2/2019 | Sweet, III | G08G 5/0086 |
| 2019/0080142 A1 | 3/2019 | Abeywardena et al. | |
| 2019/0138029 A1* | 5/2019 | Ryll | G05D 1/106 |
| 2019/0392719 A1 | 12/2019 | Parker et al. | |
| 2020/0026902 A1 | 1/2020 | Abeywardena et al. | |
| 2020/0273354 A1 | 8/2020 | Jenkins | |
| 2020/0326418 A1* | 10/2020 | Keijer | G01S 13/72 |

FOREIGN PATENT DOCUMENTS

| | | | | |
|---|---|---|---|---|
| EP | 3447527 A1 | * | 2/2019 | ............ G01J 3/2823 |
| WO | WO-2012122588 A1 | * | 9/2012 | ............. G06T 17/05 |
| WO | WO-2019093885 A1 | * | 5/2019 | ......... G06K 9/00664 |

OTHER PUBLICATIONS

Opromolla et al, Airborne Visual Detection and Tracking of Cooperative UAVs Exploiting Deep Learning, 2019, Sensors, 19(4332): 1-27. (Year: 2019).*
DeCroon et al., Sky Segmentation Approach to Obstacle Avoidance, 2011, IEEE Aerospace Conference Proceedings, pp. 1-32. (Year: 2011).*
Ahmad et al, Horizon line detection using supervised learning and edge cues, 2019, Computer Vision and Image Understanding, 191 (2020): 102879, pp. 1-16. (Year: 2019).*
Fasano et al, Sky Region Obstacle Detection and Tracking for Vision-Based UAS Sense and Avoid, 2016, J Intell Robot Syst (2016) 84: 121-144. (Year: 2016).*
Kang et al, Development of a Peripheral-Central Vision System for Small UAS Tracking, 2019, AIAA SciTech Forum, pp. 1-15. (Year: 2019).*
Xu et al, Graph-Based Horizon Line Detection for UAV Navigation, 2021, IEEE J. Select Topics in Applied Earth Observations and Remote Sensing, 2021(14): 11683-11698. (Year: 2021).*
Extended European Search Report for EP Patent Application No. 21192624.1 dated Feb. 16, 2022.
Extended European Search Report for EP Patent Application No. 21193009.4 dated Feb. 16, 2022.
Chen et al., Vision-Based Horizon Detection and Target Tracking for UAVs, 2011, pp. 310-319, ISVC 2011, Part II, LNCS 6939, published by Springer-Verlag Berlin Heidelberg.
Driessen, J., Object Tracking in a Computer Vision based Autonomous See-and-Avoid System for Unmanned Aerial Vehicles, 2004, pp. 1-68, Department of Numerical Analysis and Computer Science Royal Institute of Technology, Stockholm, Sweden.
Al-Kaff et al., Obstacle Detection and Avoidance System Based on Monocular Camera and Size Expansion Algorithm for UAVs, 2017, pp. 1-22, MDPI, 17, 1061.
Opromolla et al., Airborne Visual Detection and Tracking of Cooperative UAVs Exploiting Deep Learning, 2019, pp. 2-27, MDPI, 19, 4332.
EPO Communication concerning EP Patent Application No. 21193009.4 dated Jan. 24, 2024.

* cited by examiner

ABOVE-HORIZON TARGET TRACKING

FIELD

This disclosure relates generally to aircraft, and more particularly to image feature-based target detection and tracking.

BACKGROUND

Avoiding air collisions with other flying objects is critical to the safety of equipment and persons. Above-horizon target tracking, however, may be difficult due to various objects in the data, e.g., captured images, such as clouds, ground data, or the like.

SUMMARY

The subject matter of the subject disclosure has been developed in response to the present state of the art, and in particular, in response to the problems and disadvantages associated with conventional methods for above-horizon target tracking. Accordingly, the subject matter of the subject disclosure has been developed to detect and track above-horizon objects that overcomes at least some of the above-discussed shortcomings of prior art techniques.

Disclosed herein is a system that comprises an imaging sensor coupled to a robot. The system also comprises an imaging module configured to capture images of a scene within a field of view of the imaging sensor, which is coupled to the robot. The system further comprises an image-processing module configured to process the captured images to identify an object above a horizon in the scene within the field of view of the imaging sensor. The system additionally comprises a tracking module configured to track a trajectory of the object based on the captured images to determine positions of the object relative to the robot.

Further disclosed herein a method that comprises capturing images of a scene within a field of view of an imaging sensor, which is coupled to a robot. The method also comprises processing the captured images to identify an object above a horizon in the scene within the field of view of the imaging sensor. The method further comprises tracking a trajectory of the object based on the captured images to determine positions of the object relative to the robot.

Also disclosed herein is a computer program product comprising a computer readable storage medium having program code embodied therein. The program code is executable by a processor for receiving, from an imaging sensor, images of a scene within a field of view of an imaging sensor. The program code is also executable by a processor for processing the captured images to identify an object above a horizon in the scene within the field of view of the imaging sensor. The program code is further executable by a processor for tracking a trajectory of the object based on the captured images to determine positions of the object relative to the imaging sensor.

The described features, structures, advantages, and/or characteristics of the subject matter of the subject disclosure may be combined in any suitable manner in one or more examples and/or implementations. In the following description, numerous specific details are provided to impart a thorough understanding of examples of the subject matter of the subject disclosure. One skilled in the relevant art will recognize that the subject matter of the subject disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the subject disclosure. The features and advantages of the subject matter of the subject disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the subject disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject disclosure, however, absent an express correlation to indicate otherwise, an implementation may be associated with one or more embodiments.

Figure 1A:
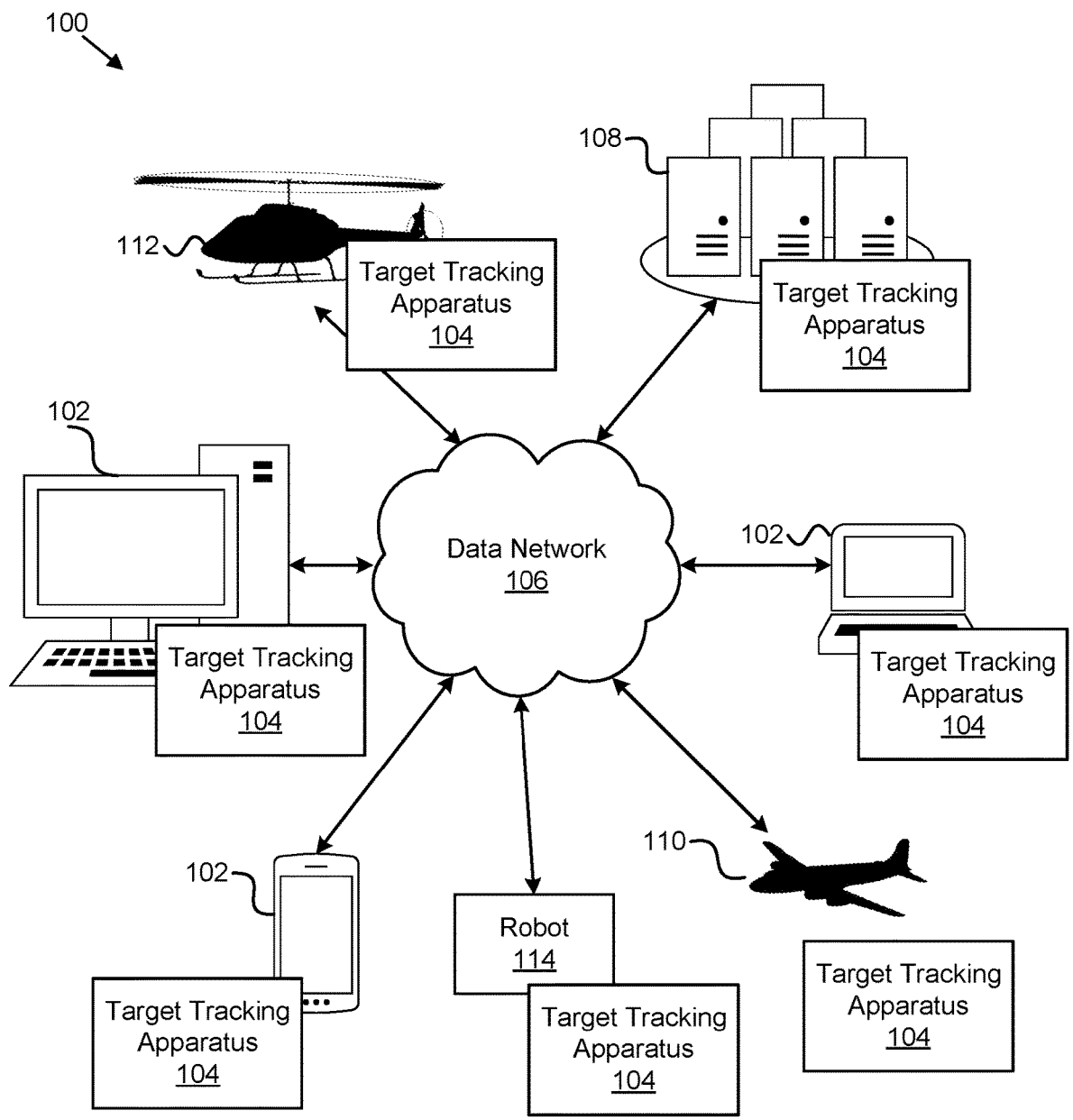
FIG. 1A is a schematic block diagram of a system for above-horizon target tracking, according to one or more examples of the subject disclosure.

FIG. 1A is a schematic block diagram of a system 100 for above-horizon target tracking, according to one or more examples of the subject disclosure. As described herein, the system 100 is a multi-sensor based above-horizon target tracking system that is designed to assist above-horizon object detection and/or tracking while an object is in flight. Based on data from various sensors (e.g., imaging and/or navigation) placed on a robot 114 such as an aircraft 110/112, a ground station or ground tower (e.g., at an airport), or the like, a series of image processing algorithms are introduced to extract meaningful above-horizon target information while avoiding false positives. The detected target track is then sent to a flight control system, e.g., an autonomous navigation module to generate full situational awareness and understanding to assist vehicle collision avoidance. The subject matter described below can be used for various applications such as "detect and avoid" ("DAA"), three-dimensional intelligence, surveillance, and reconnaissance ("ISR"), automatic target recognition ("ATR"), disaster relief, package delivery, and/or the like, as one of skill in the art will recognize in light of this disclosure.

The system 100 includes one or more information handling devices 102, one or more target tracking apparatuses 104, one or more data networks 106, one or more servers 108, one or more aircraft 110, 112, and one or more robots 114. Even though a specific number of information handling devices 102, target tracking apparatuses 104, data networks 106, servers 108, aircraft 110, 112, and robots 114 are depicted in FIG. 1, one of skill in the art will recognize, in light of this disclosure, that any number of information handling devices 102, target tracking apparatuses 104, data networks 106, servers 108, aircraft 110, 112, and robots 114 can be included in the system 100.

The information handling devices 102 of the system 100 can include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 can be located on the aircraft 110, 112 and/or robots 114 and are communicatively coupled to one or more other information handling devices 102, one or more servers 108, and/or on one or more aircraft 110, 112 or robots 114 over the data network 106, described below. The information handling devices 102 can include processors, processor cores, and/or the like that are configured to execute various programs, program code, systems, applications, instructions, functions, and/or the like for sending and receiving messages, comparing information, storing and querying data in databases, and/or the like. In certain embodiments, program code can be executed on a graphics processing unit ("GPU").

In one embodiment, the target tracking apparatus 104 is configured to capture images of a scene within a field of view of an imaging sensor, which is coupled to a robot 114 such as an aircraft 110, 112 or ground station. In further embodiments, the target tracking apparatus 104 is configured to process the captured images to identify an object (that is stationary or is moving) above a horizon in the scene within the field of view of the imaging sensor. The target tracking apparatus 104, in certain embodiments, is configured to track a trajectory of the object based on the captured images to determine positions of the object relative to the robot 114, e.g., aircraft 110, 112 while the object is in motion. The target tracking apparatus 104, including its various modules, is described in more detail below with reference to FIG. 2.

In various embodiments, the target tracking apparatus 104 is located on a robot 114 such as a ground station or an aircraft 110, 112. For simplicity, this disclosure will refer to examples where the target tracking apparatus 104 is located on an aircraft; however, one of skill in the art will recognize that the target tracking apparatus 104 can be used in conjunction with various other robots 114 included as part of ground stations, control towers, ground vehicles, and/or the like.

In one embodiment, the target tracking apparatus 104 is located on an aircraft 110, 112 as part of a flight information system, flight control system, autonomous flight system, or other computing system associated with the aircraft 110, 112; is located on or is communicatively coupled to a ground-based computing system, e.g., a ground station or ground tower; and/or some combination of the foregoing.

The target tracking apparatus 104, in some embodiments, is embodied as a hardware appliance that can be installed or deployed on an information handling device 102, on a server 108, on an aircraft 110, 112, and/or elsewhere on the data network 106. In certain examples, the target tracking apparatus 104 includes a hardware device such as a secure hardware dongle or other hardware appliance device (e.g., a set-top box, a network appliance, or the like) that attaches to a device, a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the target tracking apparatus 104 includes a power interface, a wired and/or wireless network interface, a graphical interface that attaches to a display, and/or a semiconductor integrated circuit device as described below, configured to perform the functions described herein with regard to the target tracking apparatus 104.

The target tracking apparatus 104, in some embodiments, includes a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like, in some examples. In one embodiment, the target tracking apparatus 104 is mounted on a printed circuit board with one or more electrical lines or connections (e.g., to volatile memory, a non-volatile storage medium, a network interface, a peripheral device, a graphical/display interface, or the like). The hardware appliance includes one or more pins, pads, or other electrical connections configured to send and receive data (e.g., in communication with one or more electrical lines of a printed circuit board or the like), and one or more hardware circuits and/or other electrical circuits configured to perform various functions of the target tracking apparatus 104 in some examples.

The semiconductor integrated circuit device or other hardware appliance of the target tracking apparatus 104, in certain embodiments, includes and/or is communicatively coupled to one or more volatile memory media, which can include but is not limited to random access memory ("RAM"), dynamic RAM ("DRAM"), cache, or the like. In one embodiment, the semiconductor integrated circuit device or other hardware appliance of the target tracking apparatus 104 includes and/or is communicatively coupled to one or more non-volatile memory media, which can include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

In another embodiment, the target tracking apparatus 104 consists of software services and software applications. Target tracking apparatuses, systems, modules, and/or the like can execute in memory on another device and communicate with the illustrated computing systems, flight information systems, aircraft 110, 112, or other information handling devices 102 via inter-computer communications hosted for processing images, location data, and/or the like for detecting and tracking above-horizon targets.

The data network 106, in one embodiment, includes a digital communication network that transmits digital communications. The data network 106 includes a wireless network, such as a wireless cellular network, a local wireless network, such as a Wi-Fi network, a Bluetooth® network, a near-field communication ("NFC") network, an ad hoc network, and/or the like, in certain examples. The data network 106 includes a wide area network ("WAN"), a storage area network ("SAN"), a local area network (LAN), an optical fiber network, the internet, or other digital communication network, in certain examples. In some examples, the data network 106 includes two or more networks. In one example, the data network 106 includes one or more servers, routers, switches, and/or other networking equipment. In some examples, the data network 106 includes one or more computer readable storage media, such as a hard disk drive, an optical drive, non-volatile memory, RAM, or the like.

The wireless connection is a mobile telephone network in one example. The wireless connection employs a Wi-Fi network based on any one of the Institute of Electrical and Electronics Engineers ("IEEE") 802.11 standards in one example. Alternatively, the wireless connection is a Bluetooth® connection in certain examples. In addition, the wireless connection employs a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™ in various examples.

Alternatively, the wireless connection can employ a ZigBee® connection based on the IEEE 802 standard. In one embodiment, the wireless connection employs a Z-Wave® connection as designed by Sigma Designs®. Alternatively, the wireless connection can employ an ANT® and/or ANT+® connection as defined by Dynastream® Innovations Inc. of Cochrane, Canada.

The wireless connection can be an infrared connection including connections conforming at least to the Infrared Physical Layer Specification ("IrPHY") as defined by the Infrared Data Association® ("IrDA"®). Alternatively, the wireless connection can be a cellular telephone network communication. All standards and/or connection types include the latest version and revision of the standard and/or connection type as of the filing date of this application.

The one or more servers 108, in one embodiment, are embodied as blade servers, mainframe servers, tower servers, rack servers, and/or the like. The one or more servers 108 are configured as mail servers, web servers, application servers, FTP servers, media servers, data servers, web servers, file servers, virtual servers, and/or the like in some examples. The one or more servers 108 are communicatively coupled (e.g., networked) over a data network 106 to one or more information handling devices 102 in certain examples. The one or more servers 108 store data in data structures such as databases, data repositories, or the like in some examples.

In certain embodiments, the one or more servers 108 are located on an aircraft 110, 112, and/or on the ground as part of a ground-based computing system, e.g., a ground station, and/or the like. The one or more servers 108 can include storage for storing image, video, and/or location data, and/or executable code (e.g., programs, applications, algorithms, libraries, or the like) for processing video/image data for detecting and tracking targets flying above the horizon.

In one embodiment, a robot 114 can include an aircraft 110, 112. In one embodiment, an aircraft 110 can include a fixed-wing aircraft such as an airplane, a glider, a drone, and/or the like. Another type of aircraft 112 can include a rotary-wing aircraft (rotorcraft) such as a helicopter, a gyrocopter, a gyrodyne, a rotor kite, and/or the like. In either case, the aircraft 110, 112 can be operated by a pilot on board the aircraft 110, 112 or can be controlled remotely or autonomously using an onboard flight control system.

In one embodiment, as depicted in more detail in FIG. 3, the aircraft 110, 112 includes one or more imaging sensors that are coupled to the aircraft 110, 112. The imaging sensors can include electro-optical ("EO") cameras (e.g., a camera capable of capturing images on a red, green, blue ("RGB") scale, a cyan, magenta, yellow scale, or the like), light detection and ranging ("LIDAR") sensors, and/or the like. For simplicity, the subject matter disclosed herein will refer to the imaging sensors as EO sensors/cameras, but one of skill in the art will recognize various imaging sensors/cameras that could be used separately or in conjunction with an EO camera. A single EO camera with a wide-angle lens can be used, or a plurality of EO cameras can be used to increase the field of view of the scene. The imaging sensors can be placed on the aircraft 110, 112 at locations that minimize error, disturbance, distortion, or the like due to the motion of the aircraft 110, 112.

In further embodiments, the aircraft 110, 112 includes navigation sensors, location sensors, position sensors, and/or the like that are coupled to the aircraft 110, 112, at a location that is proximate to the imaging sensors. As used herein, a navigation sensor can refer to a navigation device that uses a computer, motion sensors (e.g., accelerometers) and rotation sensors (e.g., gyroscopes) to continuously calculate by dead reckoning the position, the orientation, and the velocity (direction and speed of movement) of a moving object.

The navigation sensors can include an inertial navigation system ("INS"), global positioning system ("GPS") sensors, an altimeter, a gyroscope, a barometer, speedometers, and/or other location or positioning sensors that are capable of determining, estimating, calculating, and/or the like the position, location, movement, direction, and/or the like of an aircraft 110, 112 relative to the ground (e.g., a landing zone), relative to objects on the ground, relative to other aircraft 110, 112, and/or the like while the aircraft 110, 112 is in flight.

In certain embodiments, each of the imaging sensors is coupled to the aircraft 110, 112 adjacent to a corresponding navigation sensor. For instance, an imaging sensor and a corresponding navigation sensor can be located together within the same housing that is coupled to the aircraft 110, 112 (e.g., to an underside of the aircraft 110, 112). In such an embodiment, the imaging sensor and the corresponding navigation sensor are located no more than 0.5 meters apart from one another.

In certain embodiments, the imaging sensor and the navigation sensor are communicatively or operably coupled such that when an image is captured with the imaging sensor, location or positioning data is captured generally at the same time so that the captured image can be associated with the captured location data. In some embodiments, the aircraft 110, 112 includes at least two imaging sensors and at least two corresponding navigation sensors. In one embodiment, at least one imaging sensor is located on an underside of the aircraft 110, 112 and oriented along a horizontal plane and another at least one imaging sensor is located on an underside of the aircraft 110, 112 and oriented along a vertical plane, which can provide a view of the landing zone as the aircraft 110, 112 approaches and is located above the landing zone.

In some embodiments, a number and an orientation of the one or more imaging sensors is determined based on one or more specifications of the aircraft 110, 112. In some embodiments, the one or more specifications of the aircraft 110, 112 include a type of the aircraft 110, 112, a size of the aircraft 110, 112, a shape of the aircraft 110, 112, and a configuration of a landing gear for the aircraft 110, 112. For example, larger aircraft 110, 112 can allow for more imaging sensors and navigation sensors than smaller aircraft 110, 112. In another example, imaging and navigation sensors can be placed at locations on the aircraft 110, 112 based on the shape and/or body configuration of the aircraft 110, 112. In this manner, various aircraft makes and models can be supported and the imaging sensor settings can be adjusted (e.g., resolution, frame rate, or the like) based on the aircraft specifications.

In some embodiments, a robot 114 can include a ground station, a ground tower, a ground vehicle, and/or the like. As used herein, a ground station can include a control center that provides facilities for human support and/or control of UAV's or other aircraft 110, 112. A target tracking apparatus 104 can be located on the ground station to control imaging sensors 302, or the like, at the ground station to capture, monitor, and track objects that are flying above the horizon.

Figure 1B:
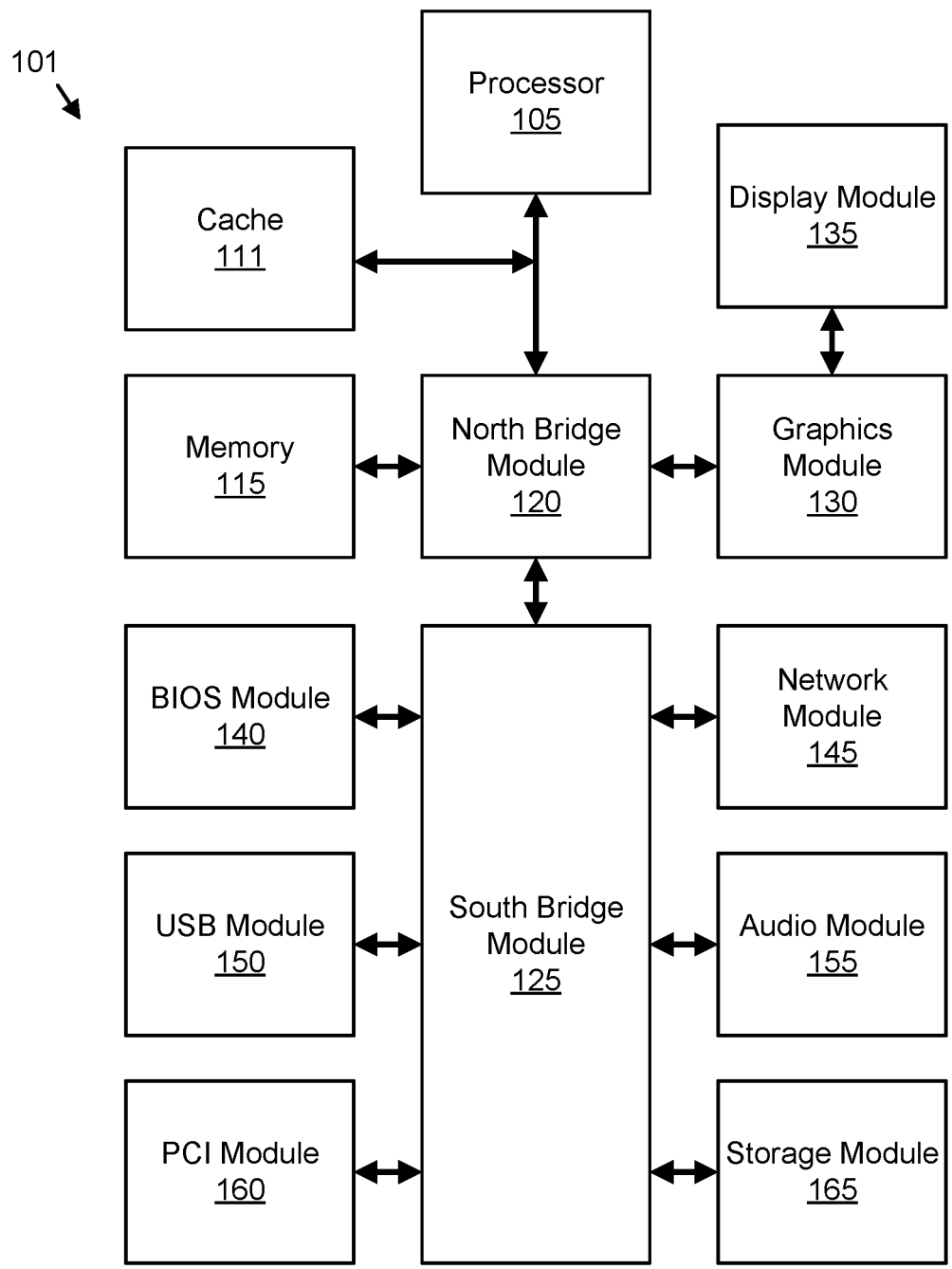
FIG. 1B is a schematic block diagram illustrating one embodiment of a computer system.

FIG. 1B is a schematic block diagram illustrating one embodiment of a computer system 101, such as any of the various information handling devices 102, robots 114, aircraft 110, 112, and/or the like, described above. The computer system 101 includes a processor 105, a cache 111, a memory 115, a north bridge module 120, a south bridge module 125, a graphics module 130, a display module 135, a basic input/output system (BIOS) module 140, a network module 145, a universal serial bus (USB) module 150, an audio module 155, a peripheral component interconnect (PCI) module 160, and a storage module 165. One of skill in the art will recognize that other configurations of a computer system 100 or multiple computer systems 100 can be employed with the embodiments described herein.

The processor 105, cache 111, memory 115, north bridge module 120, south bridge module 125, graphics module 130, display module 135, BIOS module 140, network module 145, USB module 150, audio module 155, PCI module 160, and storage module 165, referred to herein as components, can be fabricated of semiconductor gates on one or more semiconductor substrates. Each semiconductor substrate can be packaged in one or more semiconductor devices mounted on circuit cards. Connections between the components can be through semiconductor metal layers, substrate-to-substrate wiring, circuit card traces, and/or wires connecting the semiconductor devices.

The memory 115 stores computer readable programs. The processor 105 executes the computer readable programs as is well known to those skilled in the art. The computer readable programs can be tangibly stored in the storage module 165. The storage module 165 can comprise at least one SSD. In addition, the storage module 165 can include a hard disk drive, an optical storage device, a holographic storage device, a micromechanical storage device, or the like.

The processor 105 can communicate with the cache 111 through a processor interface bus to reduce the average time to access memory 115. The cache 111 can store copies of instructions and data from the most frequently used memory 115 locations. The computer system 101 can use one or more caches 111 such as a Double Data Rate 2 (DDR2) cache memory or the like.

The north bridge module 120 can communicate with and provide bridging functionality between the processor 105, the graphic module 130, the memory 115, and the cache 111. The processor 105 can be connected to the north bridge module 120 over a, for example, 667 Megahertz (MHz) front side bus.

The north bridge module 120 can be connected to the south bridge module 125 through a direct media interface (DMI) bus. The DMI bus can provide a high-speed, bi-directional, point-to-point link supporting a clock rate for example of one Gigabytes per second (1 GBps) in each direction between the north bridge module 120 and the south bridge module 125. The south bridge module 125 can support and communicate with the BIOS module 140, the network module 145, the PCI module 160, and the storage module 165.

The PCI module 160 can communicate with the south bridge module 125 for transferring data or power to peripheral devices. The PCI module 160 can include a PCI bus for attaching the peripheral devices. The PCI bus can logically connect several peripheral devices over the same set of connections. The peripherals can be selected from a printer, a joystick, a scanner, or the like. The PCI module 160 can also comprise an expansion card as is well known to those skilled in the art.

The BIOS module 140 can communicate instructions through the south bridge module 125 to boot the computer system 101, so that computer readable software instructions stored on the storage module 165 can load, execute, and assume control of the computer system 100. Alternatively, the BIOS module 140 can comprise a coded program embedded on a chipset that recognizes and controls various devices that make up the computer system 101.

The network module 145 can communicate with the south bridge module 125 to allow the computer system 101 to communicate with other devices over a network. The devices can include routers, bridges, computers, printers, and the like.

The display module 135 can communicate with the graphic module 130 to display information as will be described hereafter. The display module 135 can be a cathode ray tube (CRT), a liquid crystal display (LCD) monitor, or the like.

The USB module 150 can communicate with one or more USB compatible devices over a USB bus. The audio module 155 can generate an audio output.

In one embodiment, each module comprises a computer readable storage medium comprising a computer readable program stored on a tangible storage device. In one embodiment, the target tracking module 104 is configured to execute on the computing system 101, or similar computing system with similar or like components.

Figure 2:
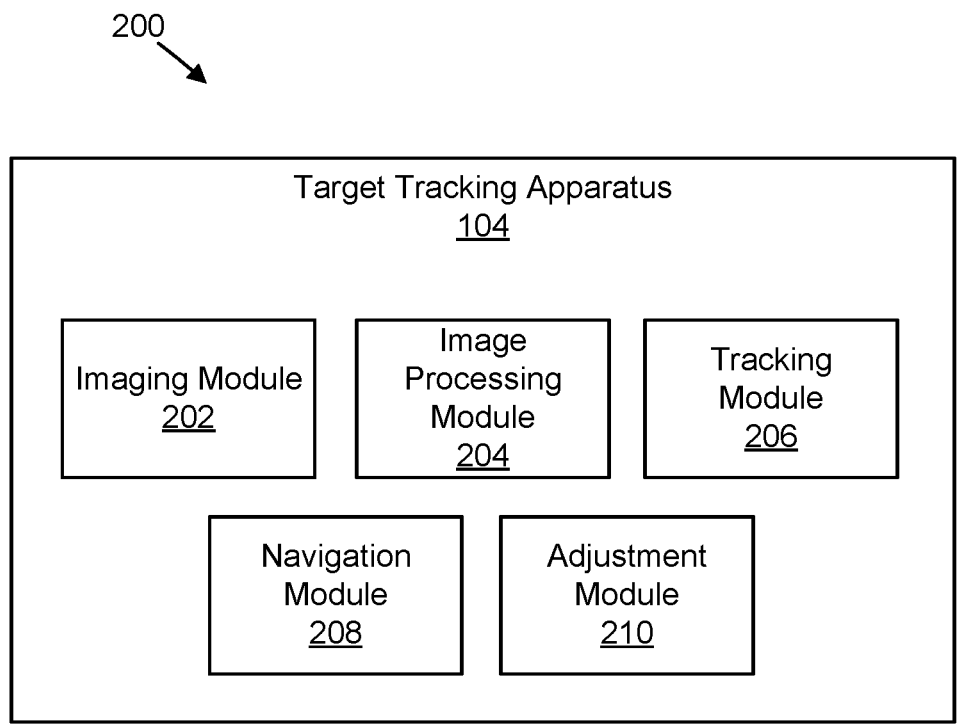
FIG. 2 is a schematic block diagram of an apparatus for above-horizon target tracking, according to one or more examples of the subject disclosure.

FIG. 2 is a schematic block diagram of an apparatus 200 for above-horizon target tracking, according to one or more examples of the subject disclosure. In one embodiment, the apparatus 200 includes an instance of a target tracking apparatus 104. The target tracking apparatus 104, in certain embodiments, includes an imaging module 202, an image-processing module 204, a tracking module 206, a navigation module 208, and an adjustment module 210, which are described in more detail below.

The imaging module 202, in one embodiment, is configured to capture images, using one or more imaging sensors, e.g., coupled to an aircraft 110, 112 or ground station, of a scene within a field of view of the one or more imaging sensors. A scene, as used herein, can refer to the environment within a field of view of the imaging sensors, aircraft 110, 112, ground station, robot 114, or the like, which can include above-horizon elements, e.g., elements in the air such as the sky, clouds, other aircraft or the like, and elements found below the horizon, e.g., mountains, trees, or other objects on the ground.

The imaging module 202 can capture images on a continuous basis, periodically, at predetermined intervals, or the like e.g., while an aircraft 110, 112 is in flight. For example, the imaging module 202 can capture images using an imaging sensor in real-time (e.g., at 30 frames per second, at 60 frames per second, or the like), every millisecond, every microsecond, every second, every 5 seconds, every 10 seconds, every 30 seconds, every minute, and/or the like.

In certain embodiments, the rate at which the imaging module 202 captures images is determined in response to identifying above-horizon objects, described in more detail below. For instance, the imaging module 202 can capture images at 30 frames per second until an above-horizon object is identified and then the imaging module 202 can increase the rate at which images are captured to 60 frames per second, for example.

In one embodiment, the image-processing module 204 is configured to process the captured images to identify an object (e.g., another aircraft) above a horizon in the scene within the field of view of the imaging sensor. As used herein, a scene is information that flows from a physical environment into a perceptual system via a sensory transducer, e.g., images/videos captured using the EO sensors. Furthermore, as used herein, a horizon or skyline is a visible line that separates earth/ground from sky.

In certain embodiments, the image-processing module 204 generates segmented images by segmenting the scene within the captured images to identify the horizon within the scene. In such an embodiment, the horizon is a visible line that divides a sky region above the horizon from a ground region below the horizon within the scene. In one embodiment, the image-processing module 204 applies a thresholding operation to the captured images to segment the sky from the ground within the scene and create the segmented images.

For example, the image-processing module 204 can apply thresholding operations on the blue color band/channel of the captured images of the scene to identify the sky portion of the scene, and distinguish it from the ground portion of the scene, and then remove the sky portion to leave foreground pixels that do not match the blue color band/channel of the sky. In one example embodiment, the thresholding operation comprises an Otsu thresholding algorithm, which returns a single intensity threshold that separate pixels into two classes, foreground and background.

As described below, the image processing module 204 can identify the ground region within the image by applying image processing algorithms, such as Otsu thresholding, to highlight the ground region in the image and generate a ground mask image, which can be used to remove the highlighted features from the feature images that are within the ground region of the scene.

Furthermore, the image processing module 204 can generate feature images by applying one or more morphological operations to the segmented images to highlight features within the sky region. As used herein, morphology is a set of images processing operations that process images based on shapes. Thus, in morphological operations, each pixel in an image is adjusted based on the value of other pixels in its neighborhood. By choosing the size and shape of the neighborhood, a morphological operation can be constructed that is sensitive to specific shapes in the input image. In certain embodiments, the image-processing module 204 applies an "any hat" feature extraction transform to the segmented images of the scene to extract features from the images. The "any hat" feature extraction can include a top-hat transform (e.g., a white top-hat transform, a back top-hat transform, or the like), a bottom-hat transform, a Mexican-hat transform, and/or the like.

In one embodiment, the image-processing module 204 identifies the object by thresholding the feature images to identify highlighted features in the sky region of the scene that can be defined as the object. Here, the image-processing module 204 identifies highlighted features in the sky region and the ground region of the feature images, and removes detections below the horizon, e.g., in the ground region. In such an embodiment, the image-processing module 204 is configured to apply a mask image to the feature images to remove the highlighted features from the feature images that are within the ground region of the scene.

As used herein, a mask image can be generated by applying one or more image processing algorithms to detect the sky region within the image. In such an embodiment, the output mask image will be a binary image where a pixel value of '1' signifies or indicates the sky region and a pixel value of '0' signifies or indicates a non-sky region, e.g., a ground region. Examples of the one or more image processing algorithms can include, but is not limited to, Otsu threshold, canny edge detector, deep-learning based methods, and/or the like.

In certain embodiments, one or more parameters of the foregoing algorithms is improved using real or actual flight test data in such as a way that the parameters can be automatically updated, as described below with reference to the adjustment module 210, to cover unseen scenarios when new flight test data becomes available. Furthermore, the foregoing combination of algorithms can be used for various applications in addition to "detect and avoid" such as three-dimensional intelligence, surveillance, and reconnaissance ("ISR"), automatic target recognition ("ATR"), disaster relief, package delivery, or the like, as one of skill in the art will recognize in light of this disclosure.

In one embodiment, the tracking module 206 is configured to track a trajectory, heading, vector, or the like of the object based on the captured images to determine positions of the object relative to the robot 114, e.g., an aircraft 110, 112 or ground station while the object is in motion. In further embodiments, the tracking module 206 is configured to track a trajectory of the object, and generate target tracks, by correlating the position of the object within a series (e.g., a plurality) of the captured images over a period of time. For instance, the tracking module 206 can correlate or connect detections of the object within each frame/image of a series of the feature images over a five or ten second time period.

In certain embodiments, the tracking module 206 is configured to determine positions of the object relative to the robot 114, e.g., aircraft 110, 112 or ground station by projecting the object from image coordinates to world coordinates. Here, the tracking module 206 projects the object from image coordinates to world coordinates by calculating an azimuth and an elevation angle to the object relative to the robot 114, e.g., an aircraft 110, 112 in response to thresholding the feature images.

Furthermore, in some embodiments, the navigation module 208 is configured to determine one or more instructions for guiding, navigating, controlling, and/or the like the robot 114, e.g., an aircraft 110, 112 to avoid the object in response to a position of the object being within a threshold proximity of the robot 114, e.g., aircraft 110, 112. For instance, the instructions can include directional movements such as left, right, up, down, faster, slower, pitch, yaw, roll, and/or the like, and can include a distance, duration, angle, and/or the like, e.g., turn right 5 degrees, turn left for 2 seconds, or the like. In some embodiments, the navigation module 208 is configured to determine one or more instructions for following the object while keeping a defined (e.g., safe) distance from the object.

In certain embodiments, the navigation module 208 is configured to estimate a distance between the robot 114, e.g., aircraft 110, 112 and the object based on the calculated azimuth and elevation angle, and determine the one or more instructions for maneuvering the robot 114, e.g., aircraft 110, 112 to avoid the object in response to the estimated distance satisfying the threshold proximity of the robot 114, e.g., aircraft 110, 112.

In certain embodiments where the robot 114 comprises an autonomous aircraft, the navigation module 208 is configured to provide the one or more instructions to a flight control system of the autonomous aircraft, which can maneuver the autonomous aircraft in real-time in response to receiving the instructions. In other embodiments, the navigation module 208 can visually or audibly provide the instructions to a pilot onboard the aircraft 110, 112 and/or a remote pilot, e.g., a drone pilot located at a ground station.

In one embodiment, the adjustment module 210 is configured to dynamically modify one or more parameters for reducing false positives of detecting the object in response to a number of highlighted features of the feature images satisfying a threshold. In such an embodiment, the one or more parameters that the adjustment module 210 dynamically modifies comprises one or more camera settings for capturing the images of the scene (e.g., aperture, exposure, ISO, focus, zoom, or the like) and one or more thresholds that the image-processing module uses to process the captured images, e.g., the thresholds for the sky segmentation, feature highlighting, and/or the like (which changes the sensitivity of the algorithms for sky segmentation and feature highlighting). In this manner, if a threshold number of false positives (e.g., identifying an object when it is not a target object) is identified, the adjustment module 210 can dynamically adjust the parameters to reduce the false positives.

Figure 3A:
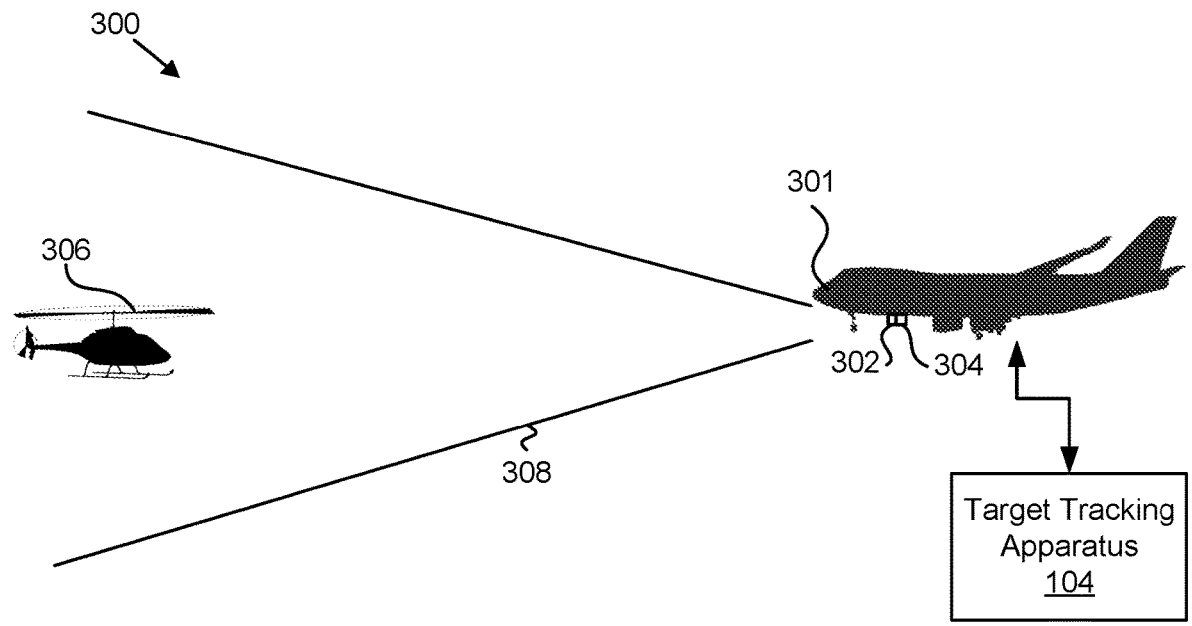
FIG. 3A depicts an example embodiment of a system for above-horizon target tracking, according to one or more examples of the subject disclosure.

FIG. 3A depicts an example embodiment of a system 300 for above-horizon target tracking, according to one or more examples of the subject disclosure. In one embodiment, the system 300 includes an aircraft 110, e.g., an airplane 301. The airplane 301 includes an imaging sensor 302, e.g., an EO camera, that is coupled to the underside of the airplane 301.

In one embodiment, the imaging sensor 302 is associated with (e.g., within the same housing as) a navigation sensor 304, such as an INS sensor that captures location data for the airplane 301 at generally the same time as when images are captured using the EO camera.

In certain embodiments, the system 300 includes a target tracking apparatus 104, as described above, that is configured to process images that are captured using the imaging sensor 302 to identify one or more objects 306 that are flying within a field of view 308 of the airplane 301/imaging sensor 302. The target tracking apparatus 104 can be located on board the airplane 301, e.g., as part of a flight control system, can be located on the ground as part of a ground computing system, which is communicatively coupled to the airplane 301 via a data network 106, and/or some combination of both.

The target tracking apparatus 104, in one embodiment, uses the captured images and the INS navigation/location data to identify objects 306 within the field of view 308 of the airplane 301 and provides output, e.g., instructions, to assist in avoiding the objects while the airplane 301 is flying. The output, for instance, can include guidance, navigation, and/or control instructions/directions (e.g., provided to a pilot on board or remote from the airplane 301, or an autonomous flight control system), a graphical or visual display of the scene with the object 306 highlighted and tracked (in real-time) with generated tracks of the object, and/or the like.

Figure 3B:
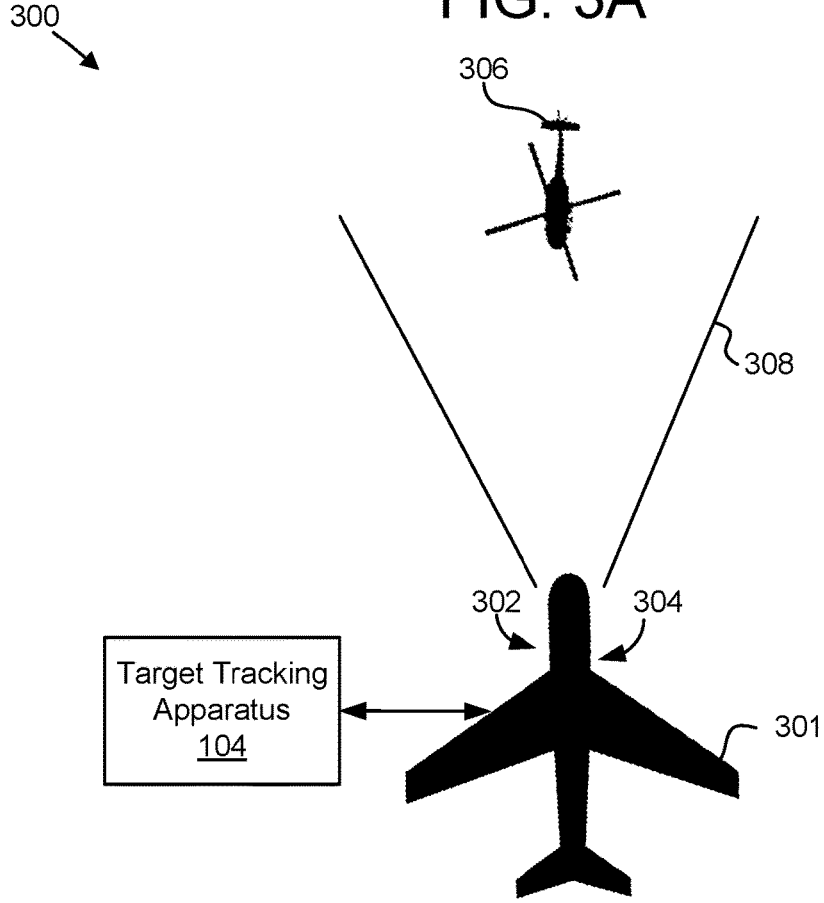
FIG. 3B depicts another example embodiment of a system for above-horizon target tracking, according to one or more examples of the subject disclosure.

FIG. 3B depicts an example embodiment of a top view of the system 300 depicted in FIG. 3A for above-horizon target tracking. As illustrated from a top perspective, the target tracking apparatus 104 detects and identifies the moving target 306 by applying various image processing algorithms (described above) to the captured images of the sky within a field of view of the airplane 301 and/or the imaging sensor 302. The target tracking apparatus 104 can then project the trajectory, direction, movement, or the like of the object and generate tracks of the object based on the trajectory by connecting or correlating a series of processed images where the object is highlighted. Furthermore, based on the tracked trajectory of the target 306, the target tracking apparatus 104 can provide instructions for avoiding the target 306.

Figure 4:
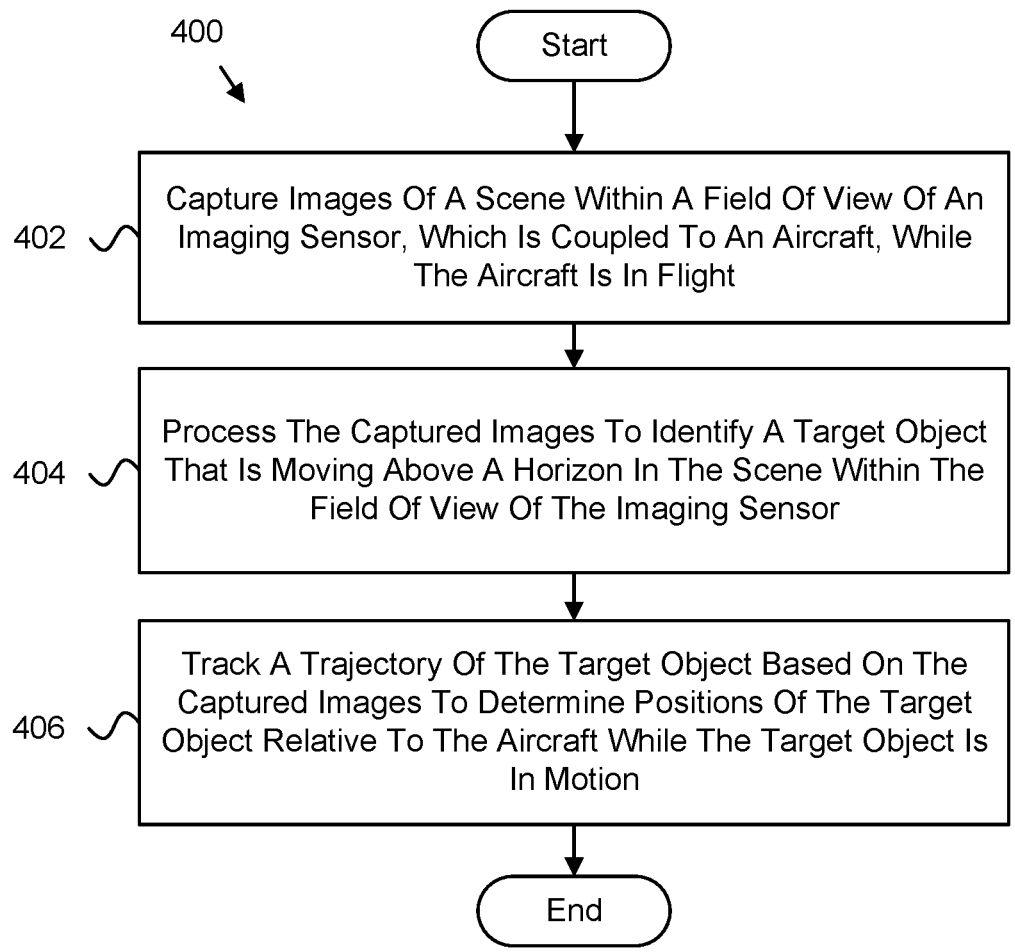
FIG. 4 is a schematic flow diagram of a method for above-horizon target tracking, according to one or more examples of the subject disclosure.

FIG. 4 is a schematic flow diagram of a method 400 for above-horizon target tracking, according to one or more examples of the subject disclosure. The method 400 begins and captures 402 images of a scene within a field of view of the imaging sensor, which is coupled to a robot 114, e.g., the aircraft 110, 112.

The method 400, in certain embodiments, processes 404 the captured images to identify an object above a horizon in the scene within the field of view of the imaging sensor. In some embodiments, the method 400 tracks 406 a trajectory of the object based on the captured images to determine positions of the object relative to the robot 114, e.g., aircraft 110, 112, and the method 400 ends. In certain embodiments, the imaging module 302, the image-processing module 204, and the tracking module 206 perform the various steps of the method 400.

Figure 5A:
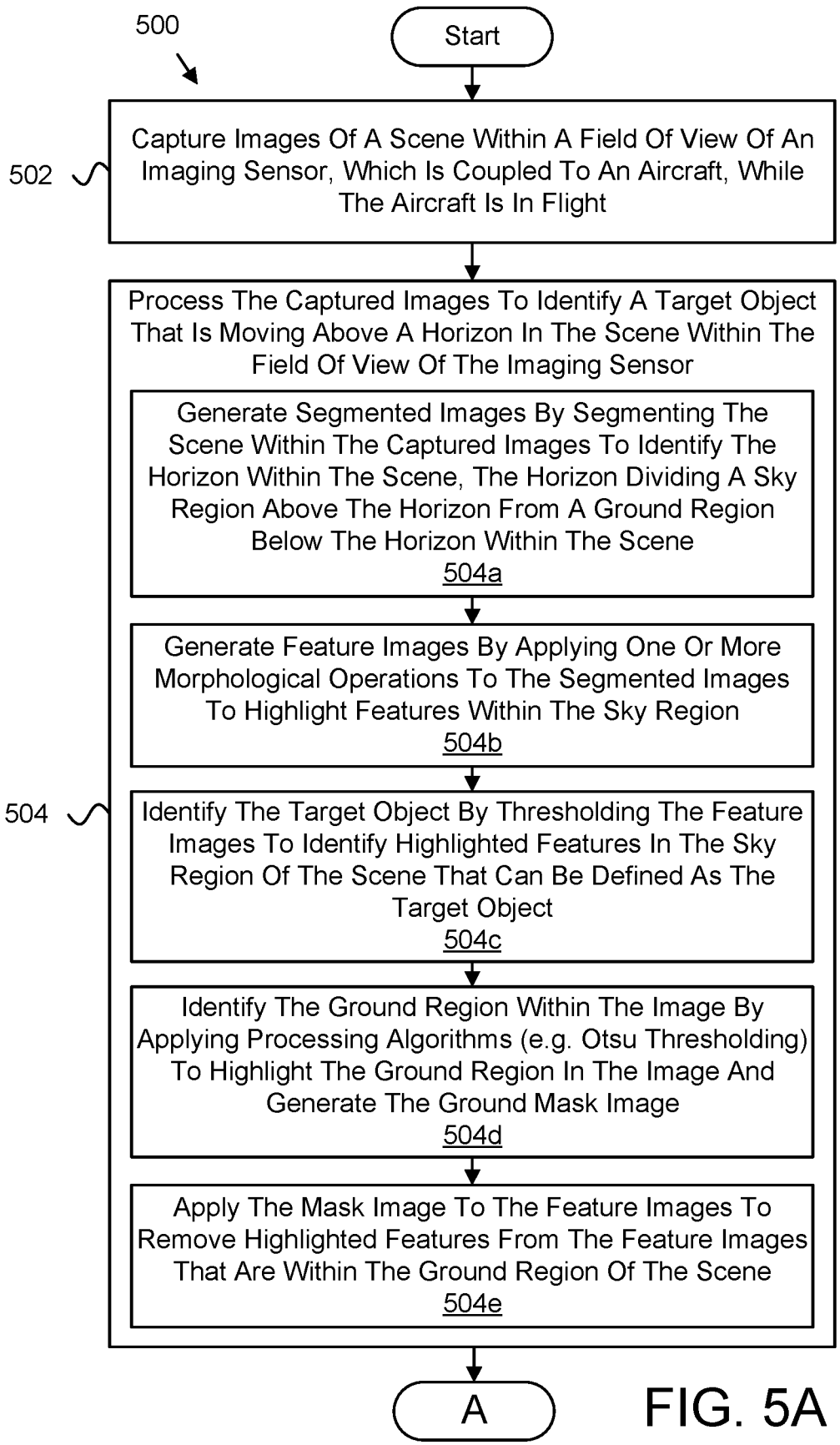
FIG. 5A is a first part of a schematic flow diagram of a method for above-horizon target tracking, according to one or more examples of the subject disclosure.

FIG. 5A is a first part of a schematic flow diagram of a method 500 for above-horizon target tracking, according to one or more examples of the subject disclosure. The method 500 begins and captures 502 images of a scene within a field of view of an imaging sensor, which is coupled to a robot 114, e.g., an aircraft 110, 112. In further embodiments, the method 500 processes 504 the captured images to identify an object above a horizon in the scene within the field of view of the imaging sensor.

In one embodiment, the method 500 generates 504a segmented images by segmenting the scene within the captured images to identify the horizon within the scene. The horizon dividing a sky region above the horizon from a ground region below the horizon within the scene. In further embodiments, the method 500 generates 504b feature images by applying one or more morphological operations to the segmented images to highlight features within the sky region.

In certain embodiments, the method 500 identifies 504c the object by thresholding the feature images to identify highlighted features in the sky region of the scene that can be defined as the object. In one embodiment, the method 500 identifies 504d the ground region within the image by applying processing algorithms, e.g., Otsu thresholding, to highlight the ground region in the image and generate the ground mask image. In one embodiment, the method 500 applies 504e a mask image, e.g., the ground mask image, to the feature images to remove highlighted features from the feature images that are within the ground region of the scene.

Figure 5B:
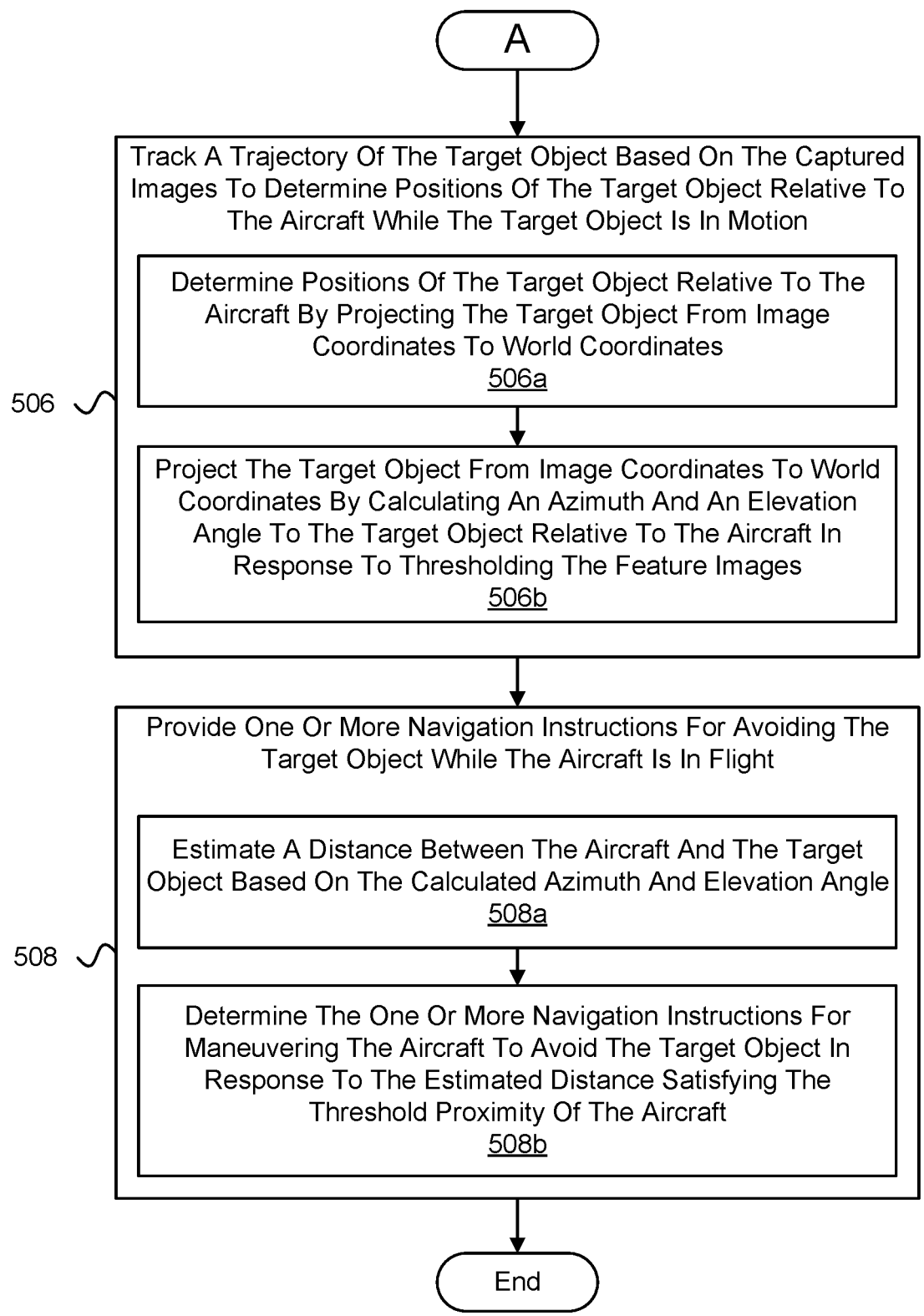
FIG. 5B is a continuation of the schematic flow diagram of FIG. 5A of a method for above-horizon target tracking, according to one or more examples of the subject disclosure.

FIG. 5B is a continuation of the schematic flow diagram of FIG. 5A of a method 500 for above-horizon target tracking, according to one or more examples of the subject disclosure. At FIG. 5B, the method 500 continues and tracks 506 a trajectory of the object based on the captured images to determine positions of the object relative to the robot 114, e.g., the aircraft 110, 112 while the object is in motion.

In certain embodiments, the method 500 determines 506a positions of the object relative to the robot 114, e.g., aircraft 110, 112 by projecting the object from image coordinates to world coordinates. In further embodiments, the method 500 projects 506b the object from image coordinates to world coordinates by calculating an azimuth and an elevation angle to the object relative to the robot 114, e.g., aircraft 110, 112 in response to thresholding the feature images.

In one embodiment, the method 500 provides 508 one or more instructions for avoiding the object. In certain embodiments, the method 500 estimates 508a a distance between the robot 114, e.g., aircraft 110, 112 and the object based on the calculated azimuth and elevation angle. In some embodiments, the method 500 determines 508b one or more instructions for navigating, guiding, and/or controlling the robot 114, e.g., aircraft 110, 112 to avoid the object in response to the estimated distance satisfying the threshold proximity of the robot 114, e.g., aircraft 110, 112, and the method 500 ends. In certain embodiments, the imaging module 202, the image-processing module 204, the tracking module 206, and the navigation module 208 perform the various steps of the method 500.

Further, the disclosure comprises embodiments according to the following clauses:

Clause 1. A system, comprising:
an imaging sensor coupled to a robot;
an imaging module configured to capture images of a scene within a field of view of the imaging sensor, which is coupled to the robot;
an image-processing module configured to process the captured images to identify an object above a horizon in the scene within the field of view of the imaging sensor; and
a tracking module configured to track a trajectory of the object based on the captured images to determine positions of the object relative to the robot.

Clause 2. The system of claim 1, wherein the image-processing module is configured to:
generate segmented images by segmenting the scene within the captured images to identify the horizon within the scene, the horizon dividing a sky region above the horizon from a ground region below the horizon within the scene;
generate feature images by applying one or more morphological operations to the segmented images to highlight features within the sky region; and
identify the object by thresholding the feature images to identify highlighted features in the sky region of the scene that can be defined as the object.

Clause 3. The system of clause 2, wherein the image-processing module is configured to apply a mask image to the feature images to remove highlighted features from the feature images that are within the ground region of the scene.

Clause 4. The system of any one of clauses 2-3, wherein the image-processing module is configured to generate the segmented images by applying an Otsu thresholding algorithm to a blue channel of the captured images.

Clause 5. The system of any one of clauses 2-4, wherein the image-processing module is configured to generate the feature images by applying a top-hat feature extraction algorithm to gray-scale versions of the segmented images.

Clause 6. The system of any one of clauses 2-5, wherein the tracking module is configured to determine positions of the object relative to the robot by projecting the object from image coordinates to world coordinates.

Clause 7. The system of clause 6, wherein the tracking module is configured to track a trajectory of the object and generate tracks of the object based on the trajectory by correlating the determined positions of the object within the captured images over a period of time.

Clause 8. The system of any one of clauses 6-7, wherein the tracking module is configured to project the object from image coordinates to world coordinates by calculating an azimuth and an elevation angle to the object relative to the robot in response to thresholding the feature images.

Clause 9. The system of any one of clauses 6-8, further comprising a navigation module that is configured to determine one or more instructions for at least one of guidance, navigation, and/or control of the robot to avoid the object in response to a position of the object being within a threshold proximity of the robot.

Clause 10. The system of clause 9, wherein the navigation module is configured to:
estimate a distance between the robot and the object based on the calculated azimuth and elevation angle; and
determine the one or more instructions for at least one of guidance, navigation, and/or control of the robot to avoid the object in response to the estimated distance satisfying the threshold proximity of the robot.

Clause 11. The system of any one of clauses 2-10, further comprising an adjustment module configured to dynamically modify one or more parameters for reducing false positives of detecting the object in response to a number of highlighted features of the feature images satisfying a threshold.

Clause 12. The system of clause 11, wherein the one or more parameters that the adjustment module dynamically modifies comprises one or more camera settings for capturing the images of the scene and one or more thresholds that the image-processing module uses to process the captured images.

Clause 13. A method, comprising:
capturing images of a scene within a field of view of an imaging sensor, which is coupled to a robot;
processing the captured images to identify an object above a horizon in the scene within the field of view of the imaging sensor; and
tracking a trajectory of the object based on the captured images to determine positions of the object relative to the robot.

Clause 14. The method of clause 13, further comprising:
generating segmented images by segmenting the scene within the captured images to identify the horizon within the scene, the horizon dividing a sky region above the horizon from a ground region below the horizon within the scene;
generating feature images by applying one or more morphological operations to the segmented images to highlight features within the sky region; and
identifying the object by thresholding the feature images to identify highlighted features in the sky region of the scene that can be defined as the object.

Clause 15. The method of any one of clauses 13-14, further comprising applying a mask image to the feature images to remove highlighted features from the feature images that are within the ground region of the scene.

Clause 16. The method of any one of clauses 13-15, further comprising determining positions of the object relative to the robot by projecting the object from image coordinates to world coordinates, wherein projecting the object from image coordinates to world coordinates comprises calculating an azimuth and an elevation angle to the object relative to the robot in response to thresholding the feature images.

Clause 17. The method of clause 16, further comprising:
estimating a distance between the robot and the object based on the calculated azimuth and elevation angle; and
determining one or more navigation instructions for maneuvering the robot to avoid the object in response to the estimated distance satisfying the threshold proximity of the robot.

Clause 18. The method of any one of clauses 16-17, further comprising tracking a trajectory of the object and generating tracks of the object based on the trajectory by correlating the determined positions of the object within the captured images over a period of time.

Clause 19. A computer program product comprising a computer readable storage medium having program code embodied therein, the program code executable by a processor for:
receiving, from an imaging sensor, images of a scene within a field of view of an imaging sensor;
processing the captured images to identify an object above a horizon in the scene within the field of view of the imaging sensor; and
tracking a trajectory of the object based on the captured images to determine positions of the object relative to the imaging sensor.

Clause 20. The computer program product of claim 19, wherein the program code is executable by the processor for:
generating segmented images by segmenting the scene within the captured images to identify the horizon within the scene, the horizon dividing a sky region above the horizon from a ground region below the horizon within the scene;
generating feature images by applying one or more morphological operations to the segmented images to highlight features within the sky region;
identifying the object by thresholding the feature images to identify highlighted features in the sky region of the scene that can be defined as the object;
determining positions of the object relative to the robot by projecting the object from image coordinates to world coordinates, wherein projecting the object from image coordinates to world coordinates comprises calculating an azimuth and an elevation angle to the object relative to the imaging sensor in response to thresholding the feature images; and
tracking a trajectory of the object and generating tracks of the object based on the trajectory by correlating the determined positions of the object within the captured images over a period of time.

In the above description, certain terms may be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system, comprising:
an imaging sensor coupled to a robot;
an imaging module configured to capture images of a scene within a field of view of the imaging sensor, which is coupled to the robot;
an image-processing module configured to process the captured images to identify an object above a horizon in the scene within the field of view of the imaging sensor; and
a tracking module configured to track a trajectory of the object based on the captured images to determine positions of the object relative to the robot,
wherein:
the image-processing module is further configured to:
generate segmented images by segmenting the scene within the captured images into a sky segment and a ground segment in each of the captured images, using a color-based thresholding operation, to automatically detect the horizon within the scene, the horizon dividing a sky region above the horizon from a ground region below the horizon within the scene;
generate feature images by applying one or more morphological operations to the sky segments of the segmented images to highlight features within the sky region; and
identify the object by thresholding the feature images to identify highlighted features in the sky region of the scene that are to be defined as the object;
the tracking module is configured to determine the positions of the object relative to the robot by projecting the object from image coordinates to world coordinates; and
the tracking module is configured to project the object from the image coordinates to the world coordinates by calculating an azimuth and an elevation angle to the object relative to the robot in response to thresholding the feature images.

2. The system of claim 1, wherein the image-processing module is configured to apply a mask image to the feature images to remove highlighted features from the feature images that are within the ground region of the scene.

3. The system of claim 1, wherein the image-processing module is configured to generate the segmented images by applying an Otsu thresholding algorithm to a blue channel of the captured images.

4. The system of claim 1, wherein the image-processing module is configured to generate the feature images by applying a top-hat feature extraction algorithm to gray-scale versions of the segmented images.

5. The system of claim 1, wherein the tracking module is configured to track the trajectory of the object and generate tracks of the object based on the trajectory by correlating the determined positions of the object within the captured images over a period of time.

6. The system of claim 1, further comprising a navigation module that is configured to determine one or more instructions for at least one of guidance, navigation, or control of the robot to avoid the object in response to a position of the object being within a threshold proximity of the robot.

7. The system of claim 6, wherein the navigation module is configured to:
estimate a distance between the robot and the object based on the calculated azimuth and elevation angle; and
determine the one or more instructions for the at least one of guidance, navigation, or control of the robot to avoid the object in response to the estimated distance satisfying the threshold proximity of the robot.

8. The system of claim 1, further comprising an adjustment module configured to modify one or more parameters for reducing false positives of detecting the object in response to a number of highlighted features of the feature images satisfying a defined criterion.

9. The system of claim 8, wherein the one or more parameters that the adjustment module modifies comprises one or more camera settings for capturing the images of the scene and one or more thresholds that the image-processing module uses to process the captured images.

10. The system of claim 1, wherein the image-processing module is further configured to:
apply a mask image to the feature images to remove highlighted features from the feature images that are within the ground region of the scene; and
generate the segmented images by applying an Otsu thresholding algorithm to a blue channel of the captured images.

11. The system of claim 10, wherein the image-processing module is further configured to generate the feature images by applying a top-hat feature extraction algorithm to gray-scale versions of the segmented images.

12. A method, comprising:
capturing images of a scene within a field of view of an imaging sensor, which is coupled to a robot;
processing the captured images to identify an object above a horizon in the scene within the field of view of the imaging sensor;
tracking a trajectory of the object based on the captured images to determine positions of the object relative to the robot;
generating segmented images by segmenting the scene within the captured images into a sky segment and a ground segment in each of the captured images, using a color-based thresholding operation, to automatically detect the horizon within the scene, the horizon dividing a sky region above the horizon from a ground region below the horizon within the scene;
generating feature images by applying one or more morphological operations to the sky segments of the segmented images to highlight features within the sky region; and
identifying the object by thresholding the feature images to identify highlighted features in the sky region of the scene that are to be defined as the object,
wherein the positions of the object relative to the robot are determined by projecting the object from image coordinates to world coordinates, and wherein projecting the object from the image coordinates to the world coordinates comprises calculating an azimuth and an elevation angle to the object relative to the robot in response to thresholding the feature images.

13. The method of claim 12, further comprising applying a mask image to the feature images to remove highlighted features from the feature images that are within the ground region of the scene.

14. The method of claim 12, further comprising:
estimating a distance between the robot and the object based on the calculated azimuth and the elevation angle; and
determining one or more navigation instructions for maneuvering the robot to avoid the object in response to the estimated distance satisfying a proximity criterion of the robot.

15. The method of claim 14, further comprising tracking the trajectory of the object and generating tracks of the object based on the trajectory by correlating the determined positions of the object within the captured images over a period of time.

16. The method of claim 12, further comprising tracking the trajectory of the object and generating tracks of the object based on the trajectory by correlating the determined positions of the object within the captured images over a period of time.

17. The method of claim 12, further comprising modifying one or more parameters for reducing false positives of detecting the object in response to a number of highlighted features of the feature images satisfying a defined criterion.

18. A computer program product comprising a non-transitory computer readable storage medium having program code embodied therein, the program code that in response to execution by a processor, perform operations comprising:
receiving, from an imaging sensor, images of a scene within a field of view of the imaging sensor;
processing the captured images to identify an object above a horizon in the scene within the field of view of the imaging sensor;
tracking a trajectory of the object based on the captured images to determine positions of the object relative to the imaging sensor;
generating segmented images by segmenting the scene within the captured images into a sky segment and a ground segment in each of the captured images, using a color-based thresholding operation, to automatically detect the horizon within the scene, the horizon dividing a sky region above the horizon from a ground region below the horizon within the scene;
generating feature images by applying one or more morphological operations to the sky segments of the segmented images to highlight features within the sky region;
identifying the object by thresholding the feature images to identify highlighted features in the sky region of the scene that are to be defined as the object; and
determining the positions of the object relative to a robot by projecting the object from image coordinates to world coordinates, wherein projecting the object from the image coordinates to the world coordinates comprises calculating an azimuth and an elevation angle to the object relative to the imaging sensor in response to thresholding the feature images.

19. The computer program product of claim 18, wherein the operations further comprise tracking the trajectory of the object and generating tracks of the object based on the trajectory by correlating the determined positions of the object within the captured images over a period of time.

20. The computer program product of claim 19, wherein the operations further comprise modifying one or more parameters for reducing false positives of detecting the object in response to a number of highlighted features of the feature images satisfying a defined criterion.

* * * * *